United States Patent
Bolorforosh et al.

(10) Patent No.: US 6,277,073 B1
(45) Date of Patent: Aug. 21, 2001

(54) MEDICAL DIAGNOSTIC ULTRASOUND IMAGING METHOD AND SYSTEM USING SIMULTANEOUSLY TRANSMITTED ULTRASOUND BEAMS

(75) Inventors: Mirsaid Seyed Bolorforosh, Portola Valley; Ching-Hua Chou, Fremont; Kutay F. Ustuner, Mountain View; Albert Gee, Los Altos, all of CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/404,089

(22) Filed: Sep. 23, 1999

(51) Int. Cl.[7] .................................................. A61B 08/00
(52) U.S. Cl. ............................ 600/437; 600/455; 600/458
(58) Field of Search .................................. 600/440, 447, 600/455, 437, 456, 655, 458; 73/625

(56) References Cited

U.S. PATENT DOCUMENTS

| | | |
|---|---|---|
| 5,113,706 | 5/1992 | Pittaro . |
| 5,379,642 * | 1/1995 | Reckwerdt et al. ................... 73/625 |
| 5,608,690 | 3/1997 | Hossack et al. . |
| 5,833,613 * | 11/1998 | Averkiou et al. ................... 600/440 |
| 5,856,955 | 1/1999 | Cole et al. . |
| 5,891,037 * | 4/1999 | Hossack et al. ................... 600/453 |

OTHER PUBLICATIONS

J.A. Hossack, *New Beamforming Approach Using High Bandwidth Transducers*, SPIE 'Medical Imaging' Conference Paper 3037–16 28th Feb. 1997.
J.A. Hossack, *Extended Focal Depth Imaging for Medical Ultrasound*, 1996 IEEE International Ultrasonics Symposium, 5th Nov. 1996.
U.S. application No. 09/253,088, filed on Feb. 19, 1999.

* cited by examiner

Primary Examiner—Marvin M. Lateef
Assistant Examiner—Maulin Patel
(74) Attorney, Agent, or Firm—Brinks Hofer Gilson & Lione

(57) ABSTRACT

A multifocus ultrasonic imaging system transmits two or more successive multifocus beams in order to increase the number of separate focal zones along a given scan line. The operating conditions for different transmit foci are controlled in a multifocus transmit event in order to optimize the operating conditions for each transmit focus and to reduce the unwanted transmit foci interference. In one example, two consecutive multifocus transmit events are transmitted and the transmit focal zones of the first and second transmit events are interleaved in range, thereby increasing the separation between transmit focal zones within a single transmit event.

49 Claims, 4 Drawing Sheets

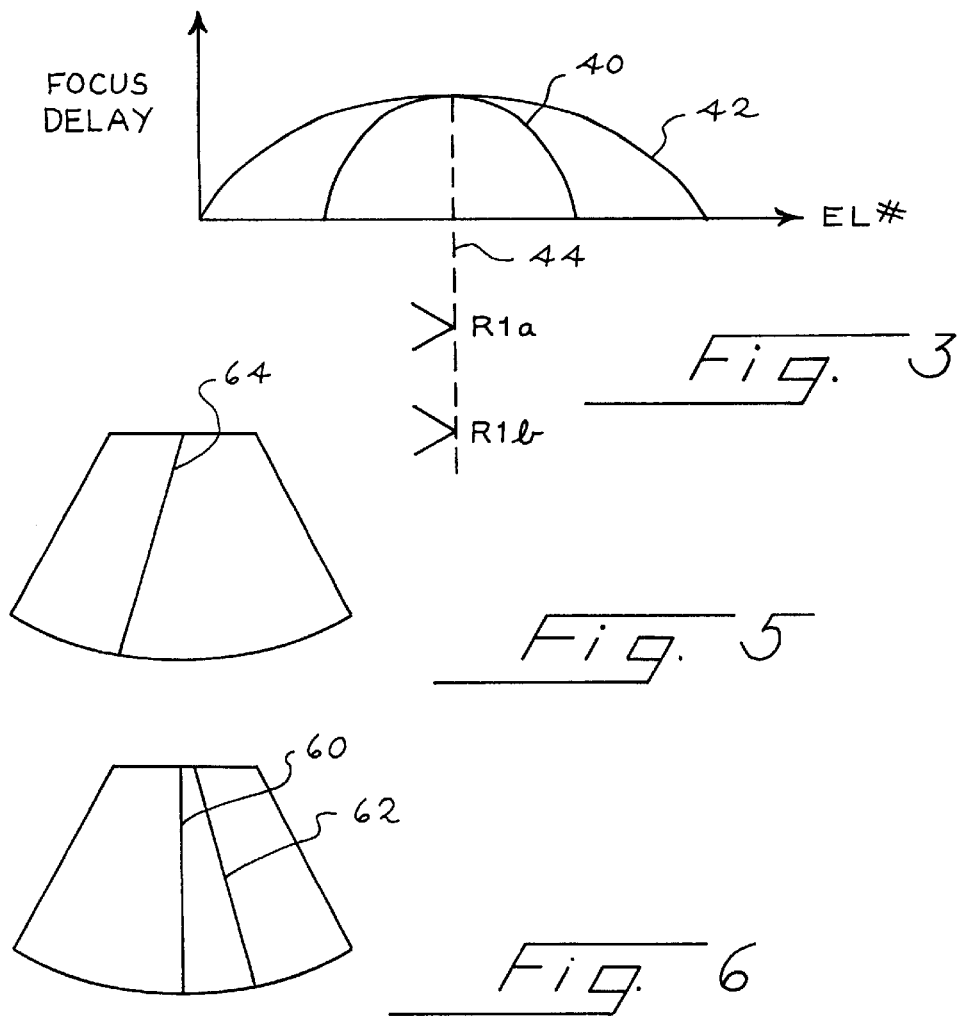
Fig. 3
Fig. 5
Fig. 6
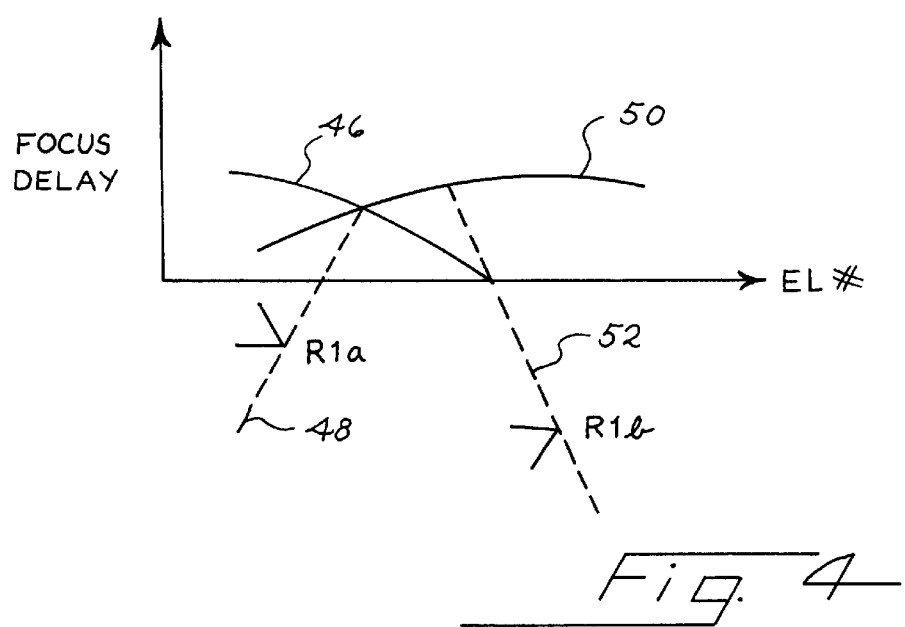
Fig. 4

MEDICAL DIAGNOSTIC ULTRASOUND IMAGING METHOD AND SYSTEM USING SIMULTANEOUSLY TRANSMITTED ULTRASOUND BEAMS

BACKGROUND

The present invention relates to medical diagnostic ultrasonic imaging, and in particular to imaging methods that increase the number of transmit focal zones while maintaining a high frame rate.

In ultrasonic imaging, beams of ultrasound energy are conventionally focused both during transmit and receive. Typically, one or two distinct transmit focal zones are transmitted for each scan direction. For each transmit focal zone a corresponding receive beam is formed. Generally, the receive beams are dynamically focused, while each transmit beam focuses the ultrasound energy at a distinct spatial position.

It is desired to increase the number of transmit focal zones in order to improve imaging resolution. However, increasing the number of transmit focal zones can result in a reduction in the frame rate, which is undesirable. This reduction in frame rate is particularly acute for single-beam transmit systems, due to the fact that only a segment of an image line is formed with each transmit focal zone, and many transmit focal zones are required to form a high resolution image.

One prior approach to this problem is to shape the transmit focus delay profile to extend the depth of field during transmit and receive. Piecewise focus and Axicon are examples of this approach. Both piecewise focus and Axicon techniques produce a relatively high side lobe level which is in many cases undesirable.

Hossack U.S. Pat. No. 5,608,690, assigned to the assignee of the present invention, describes a transmit beamformer with a frequency dependent focus. With this approach different frequencies of the transmitted beam are focused at different ranges. Hossack suggested in his paper entitled "Extended Focal Depth Imaging For Medical Ultrasound" (1996 International Ultrasonic Symposium, Nov. 5, 1996) that this frequency dependent focusing technique can be used in a multiple transmit zone configuration. As suggested in this paper, one zone may vary from 40 to 90 mm and the second zone may vary from 90 to 140 mm.

Pittaro U.S. Pat. No. 5,113,706 describes an ultrasound system with dynamic transmit focus. In one embodiment, three separate transmit events are used to create three separate transmit beams, all steered along the same scan direction but focused at different depths. This approach reduces the frame rate by a factor of three. At column 13, lines 35 through 40, the Pittaro patent suggests that other embodiments provide for multiplexing coded transmission, for example using frequency multiplexing, so that the multiple wave fronts for a given steering position can be concurrent rather than successive.

Cole U.S. Pat. No. 5,856,955, also assigned to the assignee of the present invention, describes a transmit beamformer system that allows multiple transmit beams to be created from a single firing event. As shown in FIG. 1A, simultaneously transmitted transmit beams can differ both in scan direction and focal depth. The discussion starting at column 26, line 31 clarifies that the individual beams within a single transmit event can be separately programmed for frequency, delay, apodization, as well as other parameters.

BRIEF SUMMARY

By way of introduction, the preferred embodiments described below transmit two or more simultaneous transmit beams in a single transmit event, and the individual transmit beams are focused at separate respective depths.

In one example, ultrasonic energy is transmitted into a body in first and second transmit events along the same scan direction. Ultrasonic energy of the first transmit event is focused at two or more spatially distinct first focal zones spaced along the first scan direction, and ultrasonic energy of the second transmit event is focused at two or more spatially distinct second focal zones spaced along the same scan direction. Each transmit event comprises the firing of two or more delay profiles simultaneously. The two or more delay profiles are arranged with respect to each other such that the element delays aligned at the transmit line origin for the two or more delay profiles are transmitted at the same time. If each of these transmit foci have different transmit waveforms, then two or more sets of waveforms are transmitted simultaneously. At least one of the focal zones in the second transmit event is spatially distinct from all of the focal zones in the first transmit event.

In another example, first and second ultrasonic energy are transmitted into a body in a first transmit event. The first ultrasonic energy is steered substantially along a first scan direction focused at a range $R1a$ and characterized by a power $P1a$, while the second ultrasonic energy is steered substantially along a second scan direction, focused at a range $R1b>R1a$ and characterized by a power $P1b>P1a$. $P1b$ is preferably sufficiently greater than $P1a$ to compensate for the increased level of tissue attenuation associated with the range $R1b$ as compared to the range $R1a$.

As another example, first and second ultrasonic energy are transmitted into a body in first and second transmit events, respectively. The first ultrasonic energy is focused in at least two spatially distinct first focal zones at ranges $R1a$ and $R1b$, where $R1a<R1b$, while the second ultrasonic energy is focused in at least two spatially distinct second focal zones at ranges $R2a$ and $R2b$, where $R1a<R2a<R1b$.

The foregoing paragraphs have been provided merely by way of introduction, and are not intended to limit the scope of the following claims.

BRIEF DESCRIPTION OF THE DRAWINGS

FIGS. 3 and 4 are diagrams of alternative focusing delay profiles provided by the transmitter of FIG. 1, along with the associated transmit beams.

FIGS. 5 and 6 are schematic representations of transmit beams from two consecutive transmit events.

DETAILED DESCRIPTION OF THE PRESENTLY PREFERRED EMBODIMENTS

Figure 1:
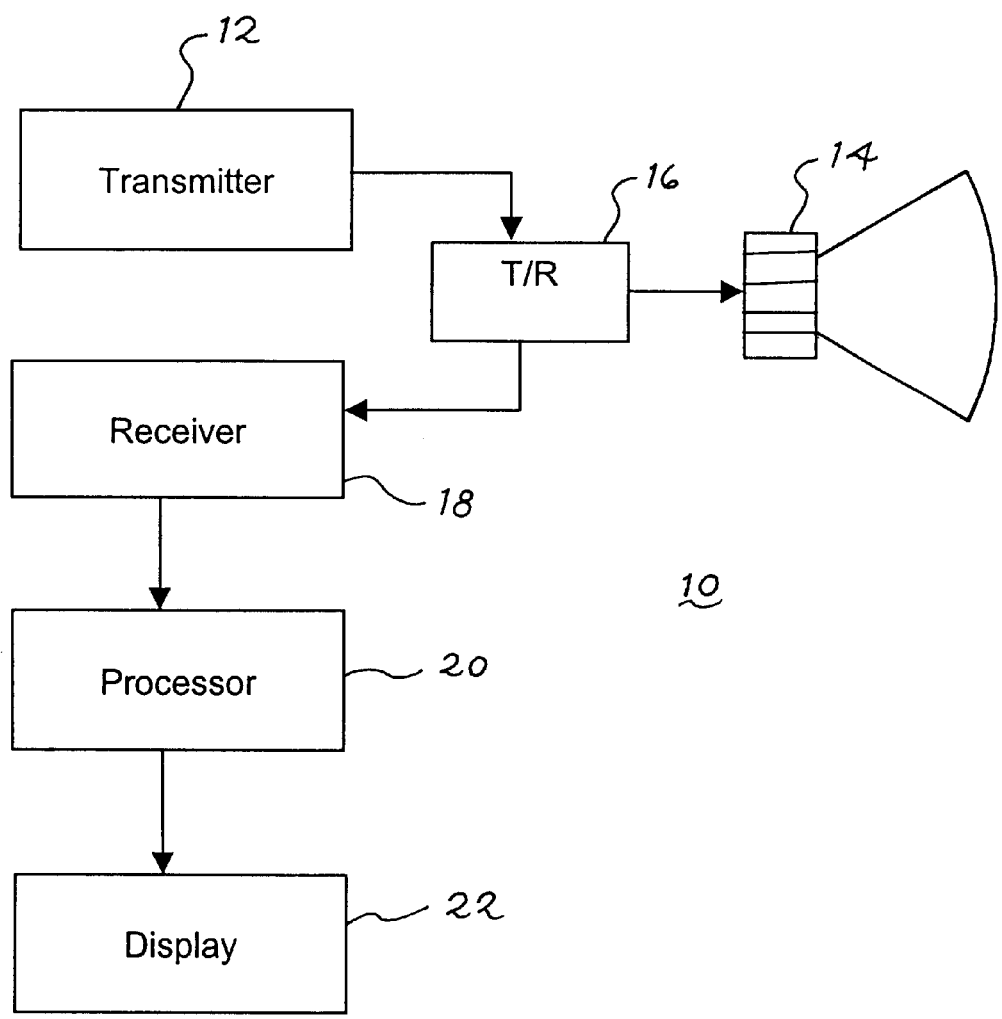
FIG. 1 is a block diagram of a medical diagnostic ultrasonic imaging system that incorporates a preferred embodiment of this invention.

Turning now to the drawings, FIG. 1 provides a block diagram of an ultrasonic imaging system 10 that incorporates a preferred embodiment of this invention. The imaging system 10 includes a transmitter 12 that is connected to a transducer array 14 by a transmit/receive switch 16. The transmitter 12 generates transmit signals for individual transducer elements included in the array 14 to cause the array 14 to transmit ultrasonic energy into the body being imaged. The transmitter 12 carefully controls the timing and phasing of the individual transmit signals to cause the transmitted ultrasonic energy to add coherently along one or more selected scan directions.

Ultrasonic echoes from the imaged region are received by the transducer array 14 and transmitted by the transmit/receive switch 16 to a receiver 18 that includes a beamformer that applies appropriate delays and summing operations to form one or more receive beams in response to each transmit event. These receive beams are processed in a processor 20 for display on a display 22.

Except for the differences described below, the elements 12 through 22 can be substantially conventional. For example, any suitable transducer array 14 can be used, including 1- or 1.5- or 2D arrays arranged on either a planar or a nonplanar surface. The transmitter 12 is preferably constructed according to the principles described in Cole U.S. Pat. No. 5,675,554 to form multiple transmit beams within each transmit event. Multiple, spaced transmit beams are discussed in the Cole patent, without any specific suggestion that such multiple transmit beams should be configured as described below. The present invention is not limited to use with transmitters 12 of this type. Alternate transmitters, including transmitters providing a frequency dependent focus as described in Hossack U.S. Pat. No. 5,608,690, can also be used. The receiver 18 may be of the type described in U.S. Pat. No. 5,685,308, assigned to the assignee of the present invention.

Figure 2:
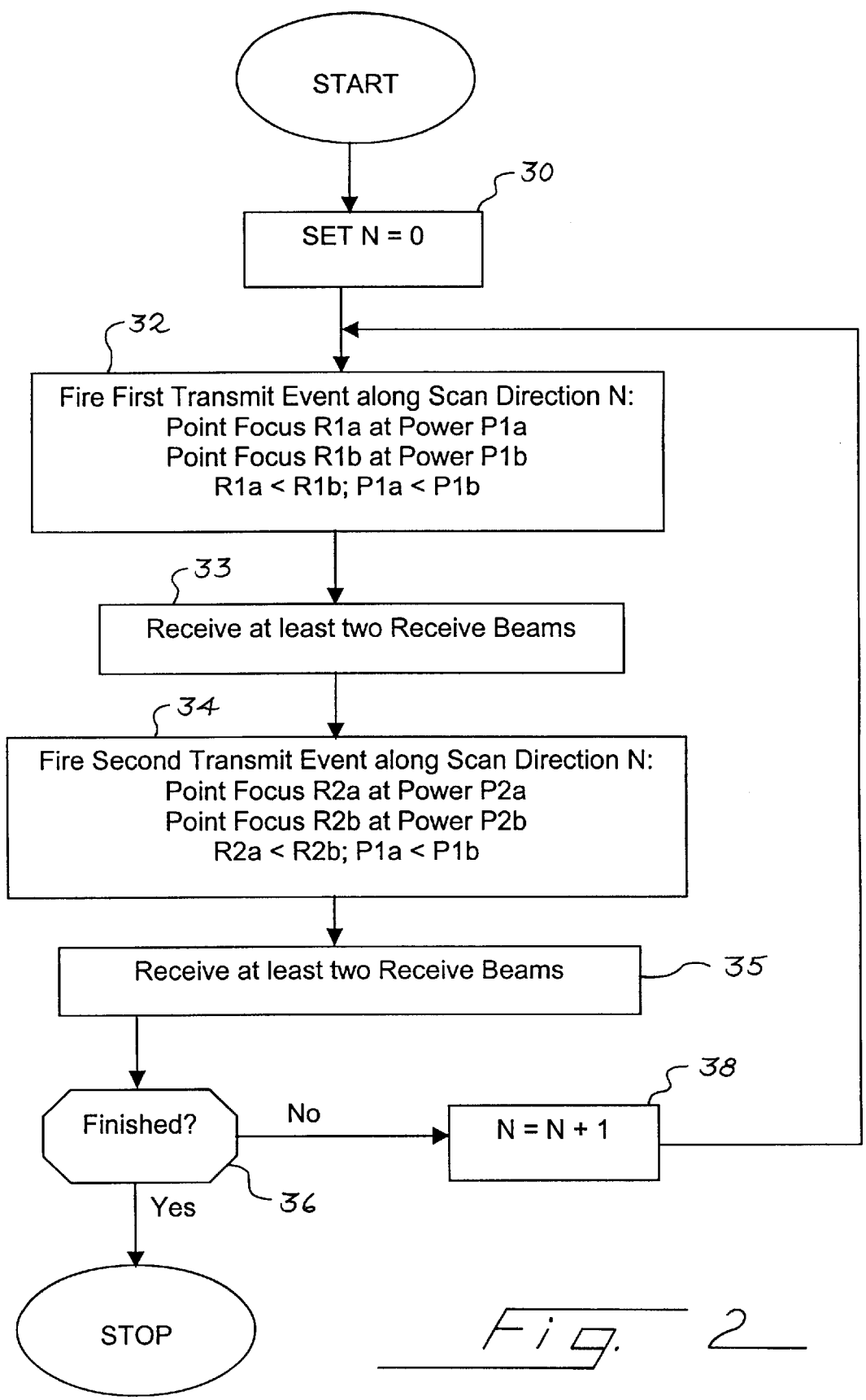
FIG. 2 is a flow chart of a method performed by the system of FIG. 1.

FIG. 2 provides a flow chart of a method performed by the system 10 of FIG. 1 to acquire a frame of image data. The parameter N is used to identify the scan direction, and N is initially set equal to zero at 30. At 32, a first transmit event is transmitted along scan direction N. This transmit event forms a multifocus transmit beam having a first point focus at a range R1$a$ and a second point focus at a range R1$b$. In this description, the Arabic number in R1$a$ indicates the firing event and the letter in R1$a$ indicates the focal zone of the corresponding beam. In this example, the first and second point foci are directed along the same scan direction N, but in alternative embodiments, the first and second point foci can be directed along different scan directions.

In this example, the transmit beam that includes the first point focus at R1$a$ is characterized by a first power level P1$a$, and the transmit beam that includes the second point focus at range R1$b$ is characterized by a second transmitter power level P1$b$. In this example, R1$a$<R1$b$, and power level P1$a$<power level P1$b$. Receive signals associated with the second point focus R1$b$ are characterized by a greater level of tissue attenuation due to the increased path length as compared with receive signals associated with the first point focus at R1$a$. Preferably, the power level P1$b$ is sufficiently greater than the power level P1$a$ to compensate for this increased level of tissue attenuation.

The receiver 18 in this example is preferably a multiple beam receiver that generates a separate receive beam for each of the separate point foci of the first transmit event. Preferably, each receive beam is spatially aligned with the transmit beam for the corresponding point focus.

Returning to FIG. 2, receive beams associated with the first transmit event are received at 33. The transmitter 12 then transmits a second transmit event along scan direction N at 34. This second transmit event again includes two separate point foci: a first point focus at range R2$a$ and power P2$a$, and a second point focus at range R2$b$ and power P2$b$. In this example, R2$a$<R2$b$ and P2$a$<P2$b$. The associated receive beams are received at 35.

After the first and second transmit events have been transmitted along direction N, and the associated receive beams have been received, the method of FIG. 2 then checks at 36 to determine whether the intended frame is finished. If not, the parameter N is incremented at 38 and control returns to block 32 to transmit a next pair of transmit events along the next scan direction.

FIGS. 3 and 5 provide further information regarding the method of FIG. 2. As shown in FIG. 3, in the first transmit event, two separate focusing delay profiles 40, 42 are applied to the transducer elements of the array 14 (FIG. 1). In FIG. 3, transducer element number is plotted on the horizontal axis and the focusing delay applied to an individual transducer element is plotted along the vertical axis. Note that two separate focusing delay profiles 40, 42 are used in the first transmit event. The first focusing delay profile 40 has a relatively smaller aperture and produces a transmit beam along the scan direction 44 focused at the focal zone centered at the range R1$a$. The second profile 42 forms a second transmit beam also directed along the scan direction 44 and focused in a focal zone centered at the range R1$b$. Note in FIG. 3 that some of the transducer elements (those in the central subaperture over which the delay profile 40 extends) contribute to both of the transmit beams. As shown in FIG. 5, the first and second transmit events (including both transmit beams of both transmit events) are all steered along the same scan direction 64.

Each of the focus delay profiles 40, 42 of FIG. 3 can provide a piecewise parabolic focus as described in our previous U.S. patent application Ser. No. 09/253,088, hereby incorporated by reference in its entirety. With a piecewise focus, some transducer elements of the array are associated during a transmit event with a first delay profile for a first focus, and other, different transducer elements are associated during the same transmit event with a second, different delay profile for a second focus.

FIG. 6 relates to a first modification of the method of FIG. 2, in which the first and second transmit events of FIG. 2 are directed along different scan directions. In the example of FIG. 6, the first transmit event of block 32 is directed along the scan direction 60, and the second transmit event of block 34 is directed along a second transmit direction 62. As one example, the transmit directions 60, 62 may be closely adjacent to one another.

FIG. 4 relates to another modification to the method of FIG. 2. In the modification diagramed in FIG. 4, the focus delay profiles applied to the transducer array in the first transmit event are steered along different scan directions. As shown in FIG. 4, a first focus delay profile 46 forms a first transmit beam along a first scan direction 48 focused in a focal zone centered at a first range R1$a$. A second focus delay profile 50 forms a second transmit beam steered along a second scan direction 52 and focused in a focal zone centered at a second range R1$b$. When the individual transmit beams of a single transmit event are steered along separate directions as shown in FIG. 4, a next transmit event may include transmit beams along the same directions as those of the first transmit event, or along different scan directions.

Figure 7:
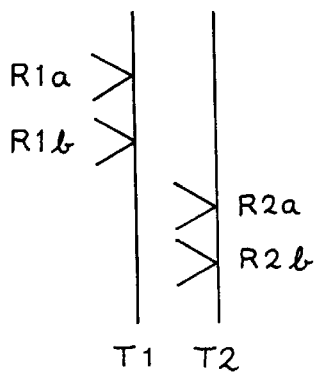
FIGS. 7 through 10 are schematic diagrams showing alternative focal zone arrangements for two consecutive transmit events.

Many variations are possible with respect to the arrangement of the separate focal zones. As shown in FIG. 7, the focal zones of the first transmit event T1 can be focused at shorter ranges than the focal zones of the second transmit event T2. In the example of FIG. 7, R$a$<R1$b$<R2$a$<R2$b$.

Figure 8:
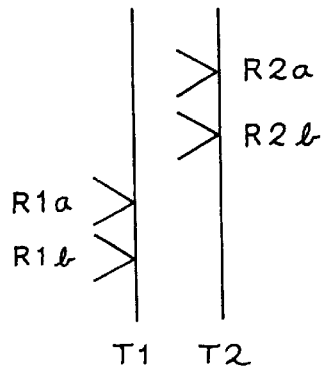

In the alternative shown in FIG. 8, the focal zones of the first transmit event T1 are positioned at a greater range than the focal zones of the second transmit event T2. In the example of FIG. 8, $R2a<R2b<R1a<R1b$.

Figure 9:
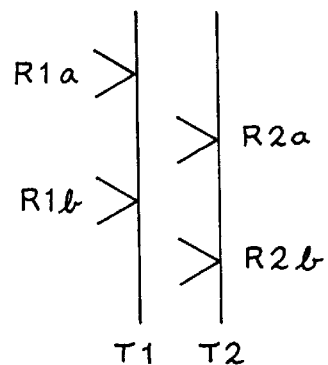

In the example of FIG. 9, the focal zones of the first and second transmit events T1, T2 are interleaved. In this example, $R1a<R2a<R1b<R2b$.

This approach increases the separation between the focal zones for a given transmit event, and thereby reduces interference between the separate transmit beams of the transmit event. When this technique is used, it is preferred that the receive information be stitched together from staggered segments of data.

Figure 10:
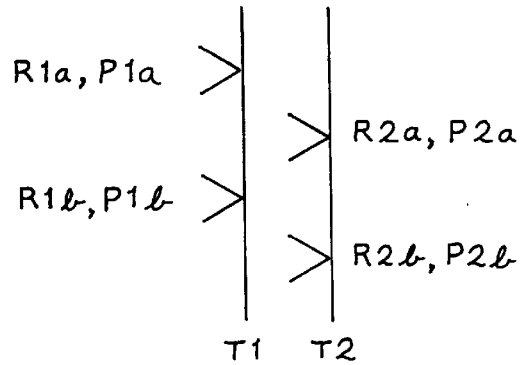

FIG. 10 shows a method similar to that of FIG. 9, except that it additionally shows that the power levels associated with the individual transmit beams are arranged as discussed above in conjunction with FIG. 2. In this example $P1a<P2a<P1b<P2b$.

Figure 11:
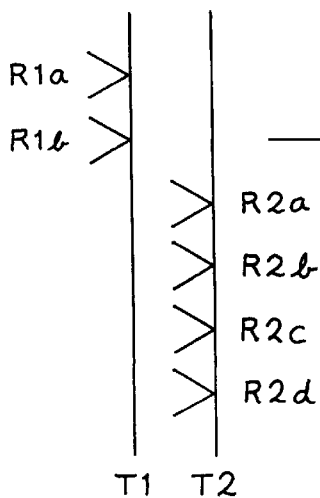
FIG. 11 is a schematic diagram showing the focal zone arrangement and the associated power levels for two consecutive transmit events.

As shown in FIG. 11, it is not required that the first and second transmit events have the same number of focal zones. In the example of FIG. 11, the first transmit event T1 includes two transmit beams focused at two different focal zones centered at ranges $R1a$, $R1b$. The second transmit event T2 includes four transmit beams focused at four separate respective focal zones centered at ranges $R2a$, $R2b$, $R2c$, $R2d$. In general, the first transmit event can be characterized by M transmit beams with separate respective focal zones, the second transmit event can be characterized by N transmit beams with separate respective focal zones, and M can be different from N.

The successive transmit events shown in FIGS. 7–11 can be along the same direction as described above or they can be along different directions. One such transmit scheme would steer the beams slightly between T1 and T2 in FIG. 7. This might help the frame rate where a dense spatial sampling of the image is desired.

In the foregoing example, the focal zones have been described on occasion as a point focus. Of course, in actual practice the high-power focal region is not limited to a single point, but rather is concentrated in a relatively small region as compared with the volume insonified by the transmit event. In alternate embodiments, the transmitter described above can be designed to provide a focus that is axially extended along the scan direction.

The transmitted ultrasonic energy and transmit beams described above can be shaped as transmit pulses or as longer duration transmit events. The term "ultrasonic energy" is intended broadly both to refer to the ultrasonic energy generated by a transmit event, as well as to the ultrasonic energy of a single beam within a transmit event.

The methods described above are well suited for a wide variety of ultrasonic imaging modes, including any of the following, as well as combinations thereof: B-mode, M-mode, color flow mode, fundamental mode, harmonic mode, tissue harmonic mode, and imaging using contrast agents.

The operating frequency for individual transmit beams within a single transmit event or between transmit events can either be similar or different. In the preferred mode of operation, the operating frequency of the individual transmit beams within a single transmit event are different from one another. Additionally, the transmitted beams within a transmit event can differ as to transmit waveform envelope. This allows the waveform to be optimized as appropriate for the transmit focus associated with each transmit beam. Having a different operating frequency for each of the transmit beams within the transmit event (and a corresponding receive frequency) assists in reducing beam-to-beam interference as well as in optimizing the transmit parameters for the location of the respective transmit focus.

By directing individual beams within a transmit event in different directions as shown in FIG. 4, as well as at different depths as shown as FIG. 4, beam-to-beam interference is reduced.

In general, each of the transmit beams within a single transmit event can have a different transmit global apodization, transmit f-number, transmit amplitude, transmit waveform envelope, transmit waveform center frequency, transmit delay offset, transmit phase, transmit phase modulation, and/or transmit frequency modulation. Different transmit waveforms within a single transmit event can also include a complex pair of waveforms which can be orthogonal to one another.

By varying the imaging parameters described above from one beam to another within a single transmit event, the unwanted interference between different transmit beams can be reduced. For example, when a first transmit beam associated with a shallower focus is transmitted with a lower amplitude or power as compared to a second transmit beam at a deeper focus, the first beam will interfere to a lesser extent with the second beam. The lower intensity or power level for the beam focused at the shallower depth can be achieved by using a lower amplitude transmit signal, a smaller aperture, or an apodization function that reduces the signal intensity for shallower focal zones as compared with deeper focal zones. The transmit waveforms can also be orthogonal functions.

Similar considerations apply to the relation between successive transmit events. By using a different amplitude of transmit waveforms in successive multifocus transmit events, one can compensate for tissue attenuation. Also by applying progressively higher transmit power to progressively deeper focal zones, which require additional power for imaging at deeper depths, the total transmit energy can be reduced, which helps the overall performance by operating below FDA thermal and acoustic power limits. Similarly, the operating frequency for transmit and receive can be changed from one firing event to the next in order to reduce interbeam interference. Similarly, the transmit waveforms used for successive transmit events can utilize different orthogonal functions in order to reduce beam-to beam interference. By varying the amplitude, phase or frequency of the transmit waveforms, one can also reduce the unwanted interference between successive transmit events. Similarly, controlling the aperture function (f-number or apodization) is another technique for controlling unwanted interference between successive transmit events. Ideally, deeper transmit foci are transmitted before shallower transmit foci to optimize system performance.

Further details regarding techniques for reducing beam-to-beam interference are discussed in co-pending U.S. patent application Ser. No. 09/370,059, filed Aug. 6, 1999 and assigned to the assignee of the present invention. This co-pending application is hereby incorporated by reference in its entirety.

As used herein, the term "set" means one or more. Thus a set of focal zones can include 1, 2, 3 or more focal zones.

Of course, it should be understood that a wide range of changes and modifications can be made to the preferred embodiments described above. For example, a wide variety of hardware, including analog as well as digital ultrasound systems, can be used. As suggested above, many different firing schemes can be used, and individual transmit events can be adapted for any desired mode of ultrasonic imaging.

The foregoing detailed description has discussed only a few of the many variations of the present invention. For this reason, this detailed description is intended by way of illustration and not limitation. It is only the following claims, including all equivalents, that are intended to define the scope of this invention.

What is claimed is:

1. An ultrasound transmit method for a medical diagnostic ultrasound imaging system, said method comprising:
   (a) transmitting first ultrasonic energy into a body in a first transmit event, said first ultrasonic energy steered substantially along a first scan direction;
   (b) transmitting second ultrasonic energy into the body in a second transmit event, said second ultrasonic energy steered substantially along the first scan direction;
   said first ultrasonic energy focused in at least two spatially distinct first focal zones spaced in range along the first scan direction, and said second ultrasonic energy focused in a set of second focal zones spaced in range along the first scan direction;
   at least one of the second focal zones being spatially distinct from all of the first focal zones.

2. The method of claim 1 wherein the set of second focal zones comprises at least two spatially distinct second focal zones.

3. An ultrasound transmit method for a medical diagnostic ultrasound imaging system, said method comprising:
   (a) transmitting first ultrasonic energy into a body in a first transmit event, said first ultrasonic energy steered substantially along a first scan direction, focused at a range $R1a$ and characterized by a power $P1a$;
   (b) transmitting second ultrasonic energy into the body in the first transmit event of act (a), said second ultrasonic energy steered substantially along a second scan direction, focused at a range $R1b>R1a$, and characterized by a power $P1b>P1a$.

4. The method of claim 3 wherein $P1b$ is sufficiently greater than $P1a$ to compensate for an increased level of tissue attenuation associated with the range $R1b$ as compared to the range $R1a$.

5. The method of claim 3 wherein transmitting acts (a) and (b) comprise the acts of transmitting the first and second ultrasonic energy, respectively, with a transducer array comprising a plurality of transducer elements, and wherein at least some of the transducer elements contribute to the generation of both the first and second ultrasonic energy.

6. The method of claim 3 wherein transmitting acts (a) and (b) comprise the acts of transmitting the first and second ultrasonic energy, respectively, with a transducer array comprising a plurality of transducer elements,
   wherein a first set of the transducer elements contributes to the generation of the first ultrasonic energy, and
   wherein a second, different set of the transducer elements contributes to the generation of the second ultrasonic energy.

7. The method of claim 3 wherein the first and second scan directions are spatially aligned.

8. The method of claim 3 wherein the first and second scan directions are spatially distinct.

9. The method of claim 3 wherein the first and second ultrasonic energy differ in ultrasonic frequency.

10. The method of claim 3 wherein the first and second ultrasonic energy differ in transmit apodization.

11. The method of claim 3 wherein the first and second ultrasonic energy differ in transmit f-number.

12. The method of claim 3 wherein the first and second ultrasonic energy differ in transmit delay.

13. The method of claim 3 wherein the first and second ultrasonic energy differ in waveform envelope.

14. The method of claim 3 wherein the first and second ultrasonic energy differ in at least one of transmit phase and transmit delay offset.

15. The method of claim 3 wherein the first and second ultrasonic energy differ in phase modulation.

16. The method of claim 3 wherein the first and second ultrasonic energy differ in frequency modulation.

17. The method of claim 3 further comprising:
   (c) transmitting third ultrasonic energy into the body in a second transmit event, said third ultrasonic energy steered substantially along a third scan direction, focused at a range $R2a$ and characterized by a power $P2a$;
   (d) transmitting fourth ultrasonic energy into the body in the second transmit event of act (c), said fourth ultrasonic energy steered substantially along a fourth scan direction, focused at a range $R2b>R2a$, and characterized by a power $P2b>P2a$.

18. The method of claim 17 wherein at least one of the first and second scan directions is spatially aligned with at least one of the third and fourth scan directions.

19. The method of claim 17 wherein at least one of the first and second scan directions is spatially distinct from at least one of the third and fourth scan directions.

20. The method of claim 17 wherein at least one of the first and second ultrasonic energy differs from at least one of the third and fourth ultrasonic energy in ultrasonic frequency.

21. The method of claim 17 wherein at least one of the first and second ultrasonic energy differs from at least one of the third and fourth ultrasonic energy in transmit apodization.

22. The method of claim 17 wherein at least one of the first and second transmit f-number differs from at least one of the third and fourth ultrasonic energy in transmit f-number.

23. The method of claim 17 wherein at least one of the first and second ultrasonic energy differs from at least one of the third and fourth ultrasonic energy in waveform envelope.

24. The method of claim 17 wherein at least one of the first and second ultrasonic energy differs from at least one of the third and fourth ultrasonic energy in at least one of transmit phase and transmit delay offset.

25. The method of claim 17 wherein at least one of the first and second ultrasonic energy differs from at least one of the third and fourth ultrasonic energy in phase modulation.

26. The method of claim 17 wherein at least one of the first and second ultrasonic energy differs from at least one of the third and fourth ultrasonic energy in frequency modulation.

27. An ultrasound transmit method for a medical diagnostic ultrasound imaging system, said method comprising:
   (a) transmitting first ultrasonic energy into a body in a first transmit event, said first ultrasonic energy focused in at least two spatially distinct first focal zones at ranges $R1a$ and $R1b$, where $R1a<R1b$;
   (b) transmitting second ultrasonic energy into the body in a second transmit event, said second ultrasonic energy focused in at least two spatially distinct second focal zones at ranges $R2a$ and $R2b$, where $R1a<R2a<R1b$.

28. The method of claim 27 wherein $R1a<R2a<R1b<R2b$.

29. The method of claim 27 wherein $R2a<R1a<R2b<R1b$.

30. The method of claim 27 wherein the first ultrasonic energy is steered substantially along a first scan direction and the first focal zones are spaced along the first scan direction.

31. The method of claim 30 wherein the second ultrasonic energy is steered substantially along a second scan direction and the second focal zones are spaced along the second scan direction.

32. The method of claim 31 wherein the first and second scan directions are spatially aligned.

33. The method of claim 31 wherein the first and second scan directions are spatially distinct.

34. The method of claim 33 wherein the first and second scan directions are adjacent to one another.

35. The method of claim 27 wherein the first focal zones are positioned on different scan directions.

36. The method of claim 35 wherein the second focal zones are positioned on different scan directions.

37. The method of claim 1 or 27 wherein the first ultrasonic energy focused in one of the at least two spatially distinct first focal zones differs in ultrasonic frequency from the first ultrasonic energy focused in another of the at least two spatially distinct first focal zones.

38. The method of claim 1 or 27 wherein the first ultrasonic energy focused in one of the at least two spatially distinct first focal zones differs in transmit apodization from the first ultrasonic energy focused in another of the at least two spatially distinct first focal zones.

39. The method of claim 1 or 27 wherein the first ultrasonic energy focused in one of the at least two spatially distinct first focal zones differs in transmit f-number from the first ultrasonic energy focused in another of the at least two spatially distinct first focal zones.

40. The method of claim 1 or 27 wherein the first ultrasonic energy focused in one of the at least two spatially distinct first focal zones differs in transmit power from the first ultrasonic energy focused in another of the at least two spatially distinct first focal zones.

41. The method of claim 1 or 27 wherein the first ultrasonic energy focused in one of the at least two spatially distinct first focal zones differs in transmit waveform envelope from the first ultrasonic energy focused in another of the at least two spatially distinct first focal zones.

42. The method of claim 1 or 27 wherein the first ultrasonic energy focused in one of the at least two spatially distinct first focal zones differs in at least one of transmit phase and transmit delay offset from the first ultrasonic energy focused in another of the at least two spatially distinct first focal zones.

43. The method of claim 1 or 27 wherein the first ultrasonic energy focused in one of the at least two spatially distinct first focal zones differs in phase modulation from the first ultrasonic energy focused in another of the at least two spatially distinct first focal zones.

44. The method of claim 1 or 27 wherein the first ultrasonic energy focused in one of the at least two spatially distinct first focal zones differs in frequency modulation from the first ultrasonic energy focused in another of the at least two spatially distinct first focal zones.

45. The method of claim 27 wherein the at least two first focal zones comprise M first focal zones, wherein the at least two second focal zones comprise N second focal zones, and wherein M·N.

46. The method of claim 1 or 27 wherein transmitting act (a) comprises the act of transmitting the first ultrasonic energy with a transducer array comprising a plurality of transducer elements, and wherein at least some of the transducer elements contribute to the generation of said first ultrasonic energy focused in each of the first focal zones.

47. The method of claim 1 or 27 wherein transmitting act (a) comprises the act of transmitting the first ultrasonic energy with a transducer array comprising a plurality of transducer elements, wherein a first set of the transducer elements contributes to the generation of said first ultrasonic energy focused in one of the first focal zones, and wherein a second, different set of the transducer elements contributes to the generation of said first ultrasonic energy focused in another of the first focal zones.

48. The method of claim 1 or 3 or 27 wherein each of the focal zones comprises a respective point focus.

49. The method of claim 1 or 3 or 27 wherein the first and second ultrasonic energy are adapted for ultrasonic imaging in a mode selected from the group consisting of: B-mode, M-mode, color flow mode, fundamental mode, harmonic mode, tissue harmonic mode, imaging using contrast agents, and combinations thereof.

* * * * *

UNITED STATES PATENT AND TRADEMARK OFFICE
CERTIFICATE OF CORRECTION

PATENT NO. : 6,277,073 B1
DATED : August 21, 2001
INVENTOR(S) : Mirsaid S. Bolorforosh et al.

It is certified that error appears in the above-identified patent and that said Letters Patent is hereby corrected as shown below:

Column 1,
Line 50, delete "35through" and substitute -- 35 through -- in its place.

Column 3,
Line 67, delete "R2aand" and substitute -- R2a and -- in its place.

Column 6,
Line 46, delete "beam-to beam" and substitute -- beam-to-beam -- in its place.

Column 10,
Line 18, delete "M·N" and substitute -- M≠N -- in its place.

Signed and Sealed this

Twenty-ninth Day of October, 2002

Attest:

JAMES E. ROGAN
Attesting Officer                Director of the United States Patent and Trademark Office